(12) United States Patent
Qi et al.

(10) Patent No.: US 11,212,162 B2
(45) Date of Patent: Dec. 28, 2021

(54) BAYESIAN-BASED EVENT GROUPING

(71) Applicant: International Business Machines Corporation, Armonk, NY (US)

(72) Inventors: Dian Qi, Beijing (CN); Fan Jing Meng, Beijing (CN); Jing Min Xu, Beijing (CN); Lin Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/515,333

(22) Filed: Jul. 18, 2019

(65) Prior Publication Data

US 2021/0021456 A1 Jan. 21, 2021

(51) Int. Cl.
*H04L 12/24* (2006.01)

(52) U.S. Cl.
CPC .......... *H04L 41/065* (2013.01); *H04L 41/069* (2013.01); *H04L 41/0636* (2013.01)

(58) Field of Classification Search
CPC . H04L 41/065; H04L 41/0636; H04L 41/069; H04L 41/0631; H04L 41/0613
USPC ........................................................ 709/224
See application file for complete search history.

(56) References Cited

U.S. PATENT DOCUMENTS

| | | | |
|---|---|---|---|
| 5,768,620 A * | 6/1998 | Johnson .................. | G06F 13/24 710/15 |
| 6,397,359 B1 * | 5/2002 | Chandra ............. | H04L 41/5009 709/224 |
| 9,213,590 B2 | 12/2015 | Lakshmanan et al. | |
| 10,083,073 B2 | 9/2018 | Ambichl et al. | |
| 10,348,549 B1 * | 7/2019 | Jagannathan ........... | H04L 41/16 |
| 2008/0031491 A1 * | 2/2008 | Ma ..................... | G06K 9/00771 382/103 |
| 2010/0052924 A1 * | 3/2010 | Bajpay ................ | H04L 41/0631 340/635 |
| 2012/0143808 A1 * | 6/2012 | Karins ................... | G06N 7/005 706/46 |
| 2013/0305080 A1 * | 11/2013 | Behrendt ............ | G06F 11/3082 714/2 |
| 2014/0040916 A1 * | 2/2014 | Balakrishnan .......... | G06F 9/542 719/313 |
| 2014/0097952 A1 * | 4/2014 | Shaw ................. | G05B 23/0272 340/517 |
| 2014/0222751 A1 * | 8/2014 | Klopotek ............... | G06N 7/005 706/59 |
| 2015/0032888 A1 * | 1/2015 | Dinger ................ | H04L 43/0876 709/224 |
| 2016/0094422 A1 * | 3/2016 | Poola .................. | H04L 67/1002 709/224 |

(Continued)

FOREIGN PATENT DOCUMENTS

| | | | |
|---|---|---|---|
| CN | 108922140 A | * | 11/2018 |
| JP | 6048688 B2 | | 12/2016 |
| JP | 2018067117 A | | 4/2018 |

*Primary Examiner* — Schquita D Goodwin
(74) *Attorney, Agent, or Firm* — Patterson + Sheridan, LLP

(57) ABSTRACT

Techniques for Bayesian-based event grouping are provided. One technique includes determining a group of alarm events from received alarm events; in response to the group of alarm events matching a group of historical alarm events, determining a first correlation, wherein the group of historical alarm events comprises correlated events associated with a same entity; and determining a root cause of the group of alarm events based on the first correlation.

18 Claims, 13 Drawing Sheets

(56) References Cited

U.S. PATENT DOCUMENTS

| | | | |
|---|---|---|---|
| 2016/0127238 A1* | 5/2016 | McCollum | H04L 43/0882 |
| | | | 709/224 |
| 2016/0148111 A1* | 5/2016 | Miyata | G06Q 10/067 |
| | | | 706/48 |
| 2016/0182274 A1* | 6/2016 | Kiesekamp | H04L 43/045 |
| | | | 709/224 |
| 2016/0328954 A1* | 11/2016 | Ramadoss | G05B 19/0428 |
| 2017/0103328 A1 | 4/2017 | Dang et al. | |
| 2017/0118092 A1* | 4/2017 | Dixon | H04L 43/045 |
| 2017/0344419 A1* | 11/2017 | Watkins | G06F 11/0781 |
| 2018/0152338 A1* | 5/2018 | Panigrahi | H04L 41/0631 |
| 2019/0057151 A1* | 2/2019 | Hassan | H04L 51/12 |
| 2019/0165988 A1* | 5/2019 | Wang | H04L 41/0631 |
| 2019/0187672 A1* | 6/2019 | Hollender | G05B 23/0267 |
| 2020/0285697 A1* | 9/2020 | Balasubramanian | |
| | | | G06F 40/205 |

* cited by examiner

BAYESIAN-BASED EVENT GROUPING

BACKGROUND

The present disclosure relates to alarm event processing, and more specifically, to Bayesian-based event grouping.

Event, also known as alarm event, is one of important types of operation data in information technology (IT) service management. Events are usually generated when an alerting system senses an error condition or a threshold has been met. When the failures and the resulting alarms occur in large quantities, this results in what is known as an alarm storm. Alarm storm is very challenging in the event management system, especially in large-scale distributed system.

SUMMARY

In general, example embodiments of the present disclosure include a method, device and computer program product for event grouping based on Bayesian network.

In an aspect, embodiments of the present disclosure provide a computer-implemented method. The method comprises determining, by one or more processors, a group of alarm events from received alarm events; in response to the group of alarm events matching a group of historical alarm events, determining, by one or more processors, a first correlation, wherein the group of historical alarm events comprises correlated events associated with a same entity; and determining, by one or more processors, a root cause of the group of alarm events based on the first correlation.

In another aspect, embodiments of the present disclosure provide a device. The device comprises a processing unit; and a memory having instructions stored thereon for execution by the processing unit, the instructions, when executed by the processing unit, cause the device to perform acts comprising: determining a group of alarm events from received alarm events; in response to the group of alarm events matching a group of historical alarm events, determining a first correlation, wherein the group of historical alarm events comprises correlated events associated with a same entity; and determining a root cause of the group of alarm events based on the first correlation.

In yet another aspect, embodiments of the present disclosure provide a computer program product that is tangibly stored on a non-transitory machine-readable medium. The instructions, when executed on a device, cause the device to determine a group of alarm events from received alarm events; in response to the group of alarm events matching a group of historical alarm events, determine a first correlation, wherein the group of historical alarm events comprises correlated events associated with a same entity; and determine a root cause of the group of alarm events based on the first correlation.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, the same or similar reference numerals represent the same or similar element.

DETAILED DESCRIPTION

Figure 1:
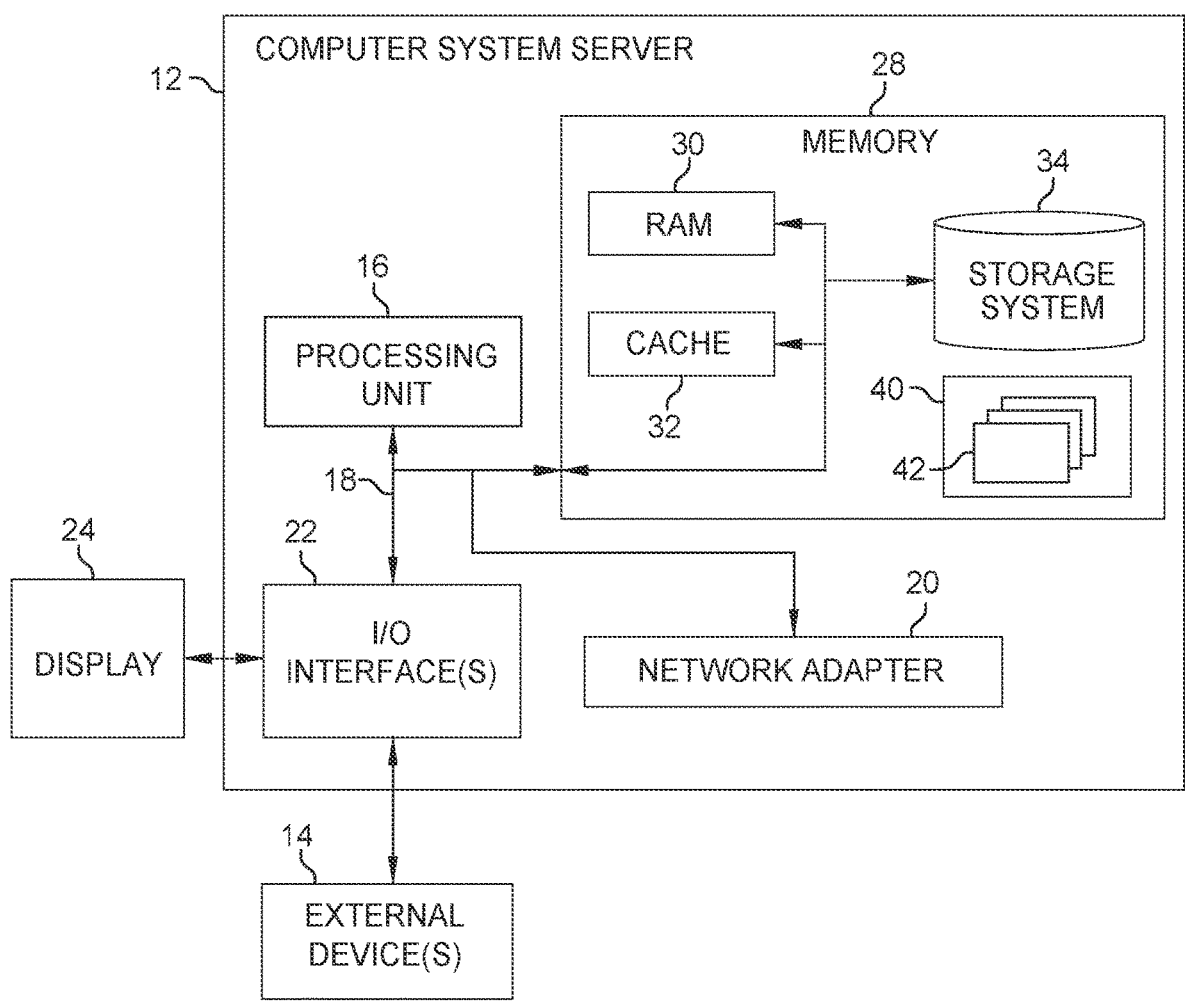
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
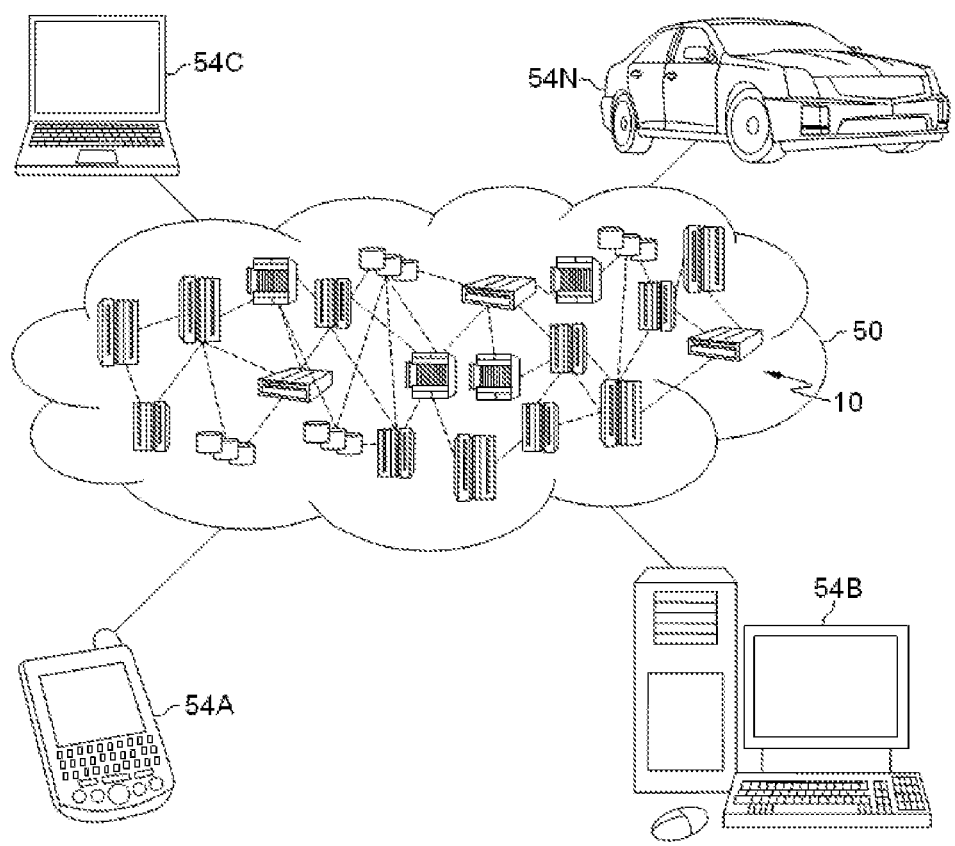
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
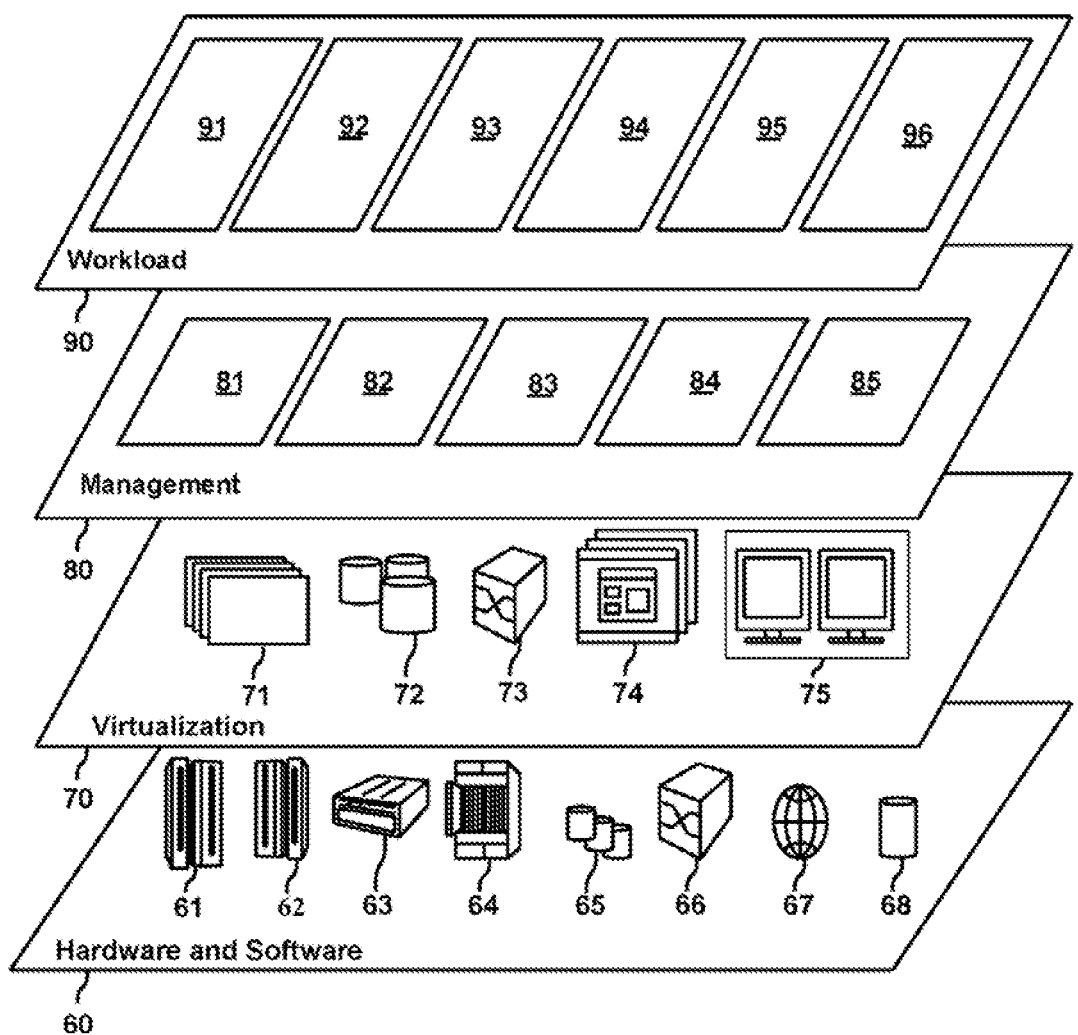
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and event grouping 96.

A system such as a datacenter may receive huge amount of abnormal events after fatal errors occurred. A typical example is an alarm storm. Security analysts try to identify root causes to circumvent similar scenarios in the future. An approach is to perform event correlation and then event grouping and reduction.

There are different event correlation techniques. For systems of known structure, Topology-Based Event Correlation can be applied, which is based on prior domain knowledge to construct correlation rules. If the topological structure of a system is unknown, other techniques, e.g., Path Condition (PC)-algorithm or Granger Causality Test (GCT), can be utilized to construct Bayesian networks that represent causal relations.

Time complexity of event correlation algorithms depends largely on dimensionality, which can be measured by number of events in a given time window. In the worst case, the runtime grows exponentially as dimensionality increases, so it is sometimes infeasible to apply such algorithms. Embodiments of the present disclosure are proposed to at least partially solve the above and other potential problems.

Figure 4:
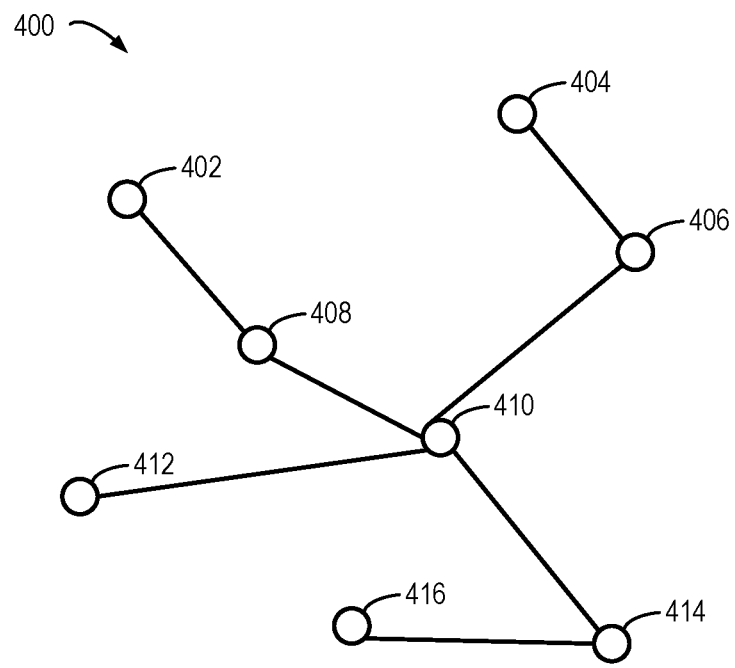
FIG. 4 is a schematic diagram illustrating an environment in which embodiments of the present disclosure can be implemented.

With reference now to FIG. 4, a schematic diagram 400 illustrating an environment in which embodiments of the present disclosure can be implemented is shown. The graph 400 can be representative of a system such as a datacenter deployed with multiple hosts, servers, or computing nodes, shows as nodes 402-416. It is to be understood that only a small portion of the nodes are illustrated in FIG. 4 and the datacenter can include a much greater number of nodes than illustrated. The nodes 402-416 can represent any other suitable entities, for example, applications executed on the nodes of the datacenter. The scope of the present disclosure is not limited thereto.

During operation, the data center can produce a large amount of alarms or events in response to various errors. The errors could be generated for various reasons, for example, network latency, computing capability, configuration, and the like. Such alarm or alert events can be referred to as an alarm storm. Maintenance personnel then will attempt to identify one or more root causes to circumvent similar scenarios in the future.

As shown in FIG. 4, the nodes 402-416 are directly or indirectly connected to one another by a network infrastructure. For example, the node 402 is connected to the node 408, which is connected to the node 410 and the node 402 is indirectly connected to the node 416. If an error occurs at one of the nodes 402-416, the error could spread to another of the nodes 402-416. As a result, a great number of errors and alarms may be produced in the datacenter, resulting in an alarm storm. In this instance, it is difficult for the maintenance personnel to identify the root cause of the alarm storm.

Event correlation, event grouping and reduction can be implemented in order to identify the root cause of the alarm storm. Complexity of such an event correlation method depends largely on dimensionality, which can be measured by number of events in a given time window. For example, the runtime can grow exponentially as dimensionality increases and in some instances it is impossible to implement the existing event correlation method.

Figure 5:
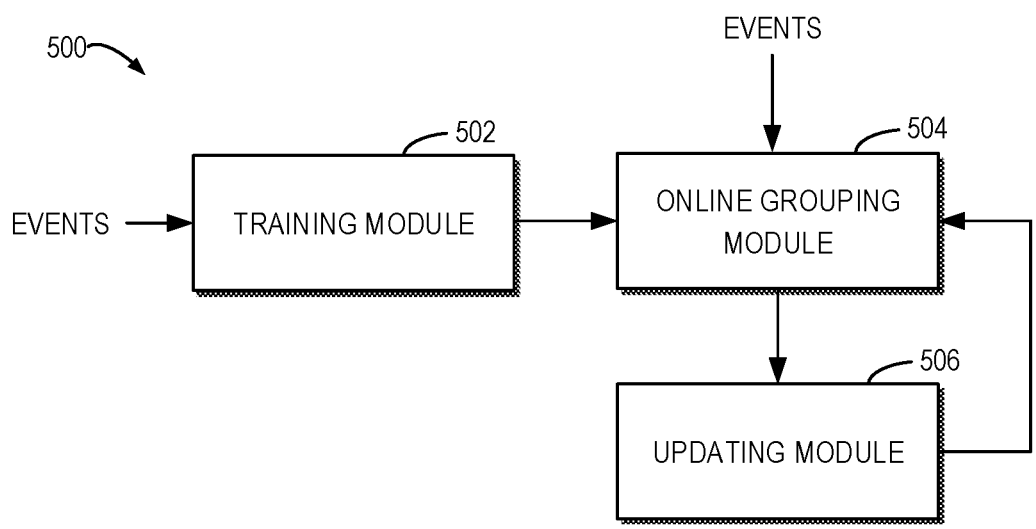
FIG. 5 is a schematic diagram of an illustrative system in accordance with an embodiment of the present disclosure.

FIG. 5 is a schematic diagram of an illustrative system 500 that can implement the event grouping 96 as shown in FIG. 3. The system 500 includes a training module 502 configured to determine correlation of the events to be trained and produce a number of groups of correlated events, where each group has one or more root causes. An online grouping module 504 is configured to receive one or more events in real time and identify at least one of the known groups that the received events can match. The matched group can indicate the root cause of the events and then guide the user or the support crews to quickly identify and eliminate the faults in the datacenter.

The system 500 can also include an updating module 506 configured to update the groups of correlated events determined by the training module 502 based on the results obtained by the online grouping module 504, especially those events that cannot match any of the groups determined by the training module 502. The present disclosure will be described in the following with reference to the system 500 of FIG. 5. However, it is to be understood that FIG. 5 is provided for illustrative purpose only without suggesting any limitations as to the scope of the present disclosure. The present disclosure can be implemented in any other suitable architecture than that shown in FIG. 5.

Figure 6:
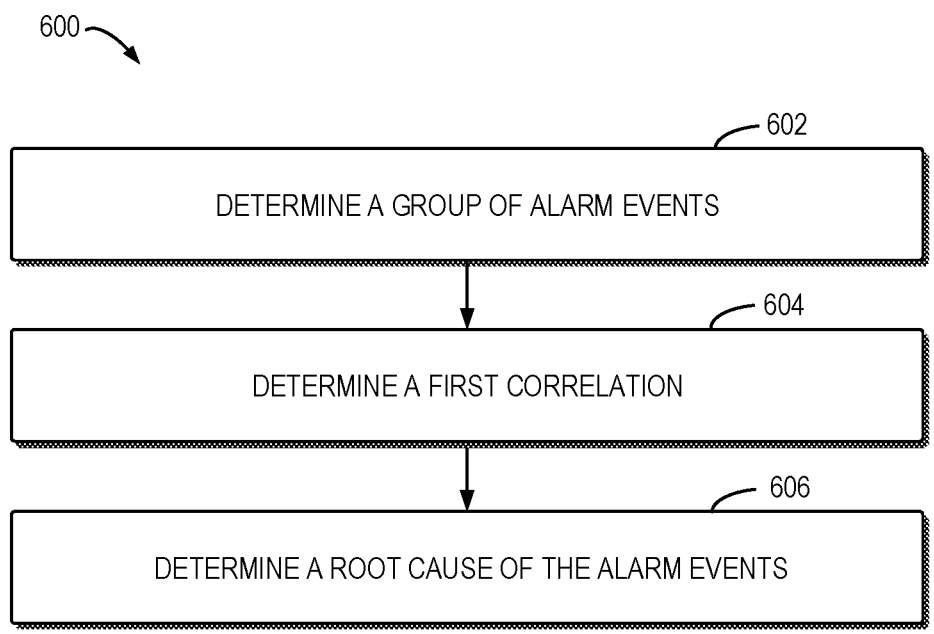
FIG. 6 is a flowchart of a method for event grouping in accordance with an embodiment of the present disclosure.

FIG. 6 is a flowchart of a method 600 for event grouping in accordance with an embodiment of the present disclosure. The method 600 can be implemented at the computer system/server 12 of FIG. 1, the event grouping 96 of FIG. 3, or the system 500 of FIG. 5, for example.

At block 602, the online grouping module 504 can receive alarm events and then determine a group of alarm events based on the received alarm events. For example, the online grouping module 504 can continuously or periodically receive alarm events from a monitor system configured to monitor failure or alarm events of a datacenter. Alternatively, the online grouping module 504 can continually receive alarm events from various hosts in the datacenter. The online grouping module 504 can group all the alarm events in a predefined time window into the group of alarm events. The predefined time window can be extended in case there are no sufficient events for online grouping.

At block 604, the online grouping module 504 can determine a first correlation among a group of historical alarm events that match the group of alarm events. The group of historical alarm events includes correlated events associated with a same entity. For example, more than one historical alarm event is associated with the same entity. In some embodiments, the entities can be hosts or applications where the alarm events occur. For example, the entities may be the nodes 402-416 as shown in FIG. 4. Reference will now made to the hosts without suggesting any limitation as to the scope of the present disclosure.

For example, the online grouping module 504 can determine the similarities between the group of alarm events and each group of historical alarm events, so as to identify a group of historical alarm events that have the greatest similarity with the group of alarm events. For example, the similarities can be similarity of the hosts and/or events between the two groups. The joint probability of the group of historical alarm events can also be computed to determine whether the group of historical alarm events has a high probability of occurrence. For example, a group of historical alarm events with a joint probability above a threshold has a high probability of occurrence and thus can be used to identify the root cause of the received group of alarm events.

The correlation among the events or entities can be a non-causal relationship such as a statistical or informational relationship, and the correlation can also be a causal relationship. A Bayesian network is a very powerful mathematical tool that represents the relationship between random variables. In some embodiments, the correlation herein can be characterized by a Bayesian network. A Bayesian network is a probabilistic graphical model (a type of statistical model) that represents a set of variables and their conditional dependencies via a directed acyclic graph (DAG). For example, a Bayesian network can be represented as a DAG, together with a collection of conditional probability tables. Bayesian networks are ideal for taking an event that occurred and predicting the likelihood that any one of several possible known causes was the contributing factor.

Edges represent conditional dependencies; nodes that are not connected (no path connects one node to another) represent variables that are conditionally independent of each other. Each node is associated with a probability function that takes, as input, a particular set of values for the node's parent variables, and gives (as output) the probability (or probability distribution, if applicable) of the variable represented by the node. The probability function can also be replaced by a conditional probability table representing the conditional probability of the variable represented by the node.

In some embodiments, the first correlation among the events can be characterized by a Bayesian network. The Bayesian network includes nodes representing the events and edges representing conditional dependencies among the events. For example, each node can have an associated probability function or conditional probability table. The Bayesian network can also be referred to as an event Bayesian network.

In some embodiments, the event Bayesian network can be determined by the training module 502 based on a Bayesian network of entities. The Bayesian network includes nodes representing the entities and edges representing conditional dependencies among the entities. For example, each node can have an associated probability function or conditional probability table. The Bayesian network can also be referred to as a host Bayesian network or an entity Bayesian network. Reference is now made to the training module 502 to describe how to obtain the first correlation based on Bayesian networks.

In general, the training module 502 can determine the first correlation from a first Bayesian network comprising nodes representing the group of the historical alarm events and edges representing conditional dependencies among the group of the historical alarm events. The first Bayesian network, also referred to as an event subgraph, can be a subgraph of a combined event Bayesian network including a large number of event subgraphs.

For example, the training module 502 can determine the first Bayesian network from a subgraph of a second Bayesian network comprising nodes representing entities and edges representing conditional dependencies among the entities. The subgraph comprises nodes representing the group of entities associated with the group of historical alarm events and edges representing conditional dependencies among the group of entities. Each node in the subgraph is not connected to any node in the second Bayesian network outside the subgraph. As described above, at least one of the group of entities are associated with more than one of the group of historical alarm events.

Generally, the events are not evenly distributed in time, and average time lag between two correlated events could be substantially different. As a result, the host Bayesian network can be constructed in a respective time window. The networks for different time windows can be combined to construct a combined Bayesian network as the host Bayesian network. The time window can be dynamically selected, for example, based on the most correlated two events in a default time window.

In some embodiments, the training module 502 can determine a third Bayesian network for a first time window or slot. The third Bayesian network includes nodes representing a first set of entities and edges representing conditional dependencies among the first set of entities. The training module 502 can also determine a fourth Bayesian network for a second time window or slot. The fourth Bayesian network includes nodes representing a second set of entities and edges representing conditional dependencies among the second set of entities.

The first time window or slot can be determined based on a first alarm event and a second alarm event that are most correlated in a default or predetermined time slot. The second time slot can be determined based on a third alarm event and a fourth alarm event that are most correlated in the default time slot. For example, if a default time slot is one hour, the events can be divided into a number of groups based on the default time slot. For each time slot, the training module 502 can determine two events that are most correlated to each other and the time window can be determined to equal the time span of the two events.

The third and fourth Bayesian networks can be combined to obtain the host Bayesian network. In addition to the third and fourth Bayesian networks, any other suitable Bayesian networks based on events in any other suitable time windows can also be combined to obtain the host Bayesian network. For example, a first conditional frequency table for each node in the third Bayesian network and a second conditional frequency table for each node in the fourth Bayesian network can be obtained. Conditional frequency table is a table that describes the conditional frequency between the nodes. A conditional frequency table for each node of the host Bayesian network can be determined based on the first and second conditional frequency tables. For example, when combining the third and fourth Bayesian networks, the weight of each edge in the networks can be computed and the weighted conditional frequency table of the host Bayesian network can be determined based on the weights and the conditional frequency tables. For example, the weight of the edge can depend on the degree of confidence in independent test and the time slot/window. For example, the weight of the edge can be proportional to the degree of confidence and can also be inversely proportional to the time slot.

In some embodiments, the training module 502 can determine a subgraph of the host Bayesian network, also referred to as a host subgraph. For example, each node in the host subgraph is not connected to any node in the host Bayesian network outside the host subgraph.

In some embodiments, the training module 502 can determine a subgraph of an event Bayesian network (also referred to as an event subgraph) based on the associated subgraph of the host Bayesian network by causal inference on the events of the event subgraph, for example. The event Bayesian network includes nodes representing the alarm events and edges representing conditional dependencies among the alarm events, and the event subgraph includes nodes representing the subset of alarm events and edges representing conditional dependencies among the subset of the alarm events. The nodes of the event subgraph includes at least one root node indicating a root cause of the subset of alarm events.

In accordance with the embodiments of the present disclosure, the training module 502 can determine the event Bayesian network by determining correlation among the events that occur at the closely correlated hosts. In other words, the training module 502 does not have to determine correlation between every two events. In this way, the dimensionality can be substantially reduced and accordingly computer resource can be significantly reduced and computer efficiency can be significantly improved.

At block 606, the online grouping module 504 determines a root cause of the group of historical alarm events based on the first correlation, for example, the first Bayesian network. Since the root cause of the group of historical alarm events is the same as the root cause of the group of alarm events, the root cause of the group of historical alarm events can be used as the root cause of the received alarm events. The first Bayesian network includes at least one root node that indicates the root cause of the group of historical events. The online grouping module 504 can determine the root cause of the group of historical alarm events based on the first Bayesian network.

As described above, the updating module 506 can update the subgraph of the host Bayesian network based on the group of alarm events. For example, the updating module 506 can update the weights of the edges in the matched host subgraph based on the group of alarm events. The updating module 506 can also update probabilities of the group of entities based on the group of alarm events. For example, the updating module 206 can update the probabilities of the nodes of the matched host subgraph based on the group of alarm events. Then the updating module 506 can perform causal inference based on the updated subgraph and the group of alarm events to update the first correlation or the first Bayesian network. For example, the updating module 506 can use any method or algorithm currently known or to be developed in the future to perform the causal inference, for example, PC-algorithm.

In some embodiments, the training module 502 can extract templates of the alarm events, also referred to as event templates or just templates. The templates are an abstract of the events to remove the fluctuation or numerical variation of the events. As a result, the correlation of the events can be a correlation among the templates of the events.

The updating module 506 can update the template determined by the training module 502. For example, if the online grouping module 504 determines that an event does not match any of the known templates, the online grouping module 504 can provide the event to the updating module 506. The updating module 506 can gather the unmatched events and extract one or more templates based on the unmatched events and then add the new template to the known templates.

By updating the existing relationship periodically or in real time, the system 500 can manifest the up-to-date change in the datacenter. Therefore, the system 500 can dynamically determine the root cause in an accurate manner.

Figure 7:
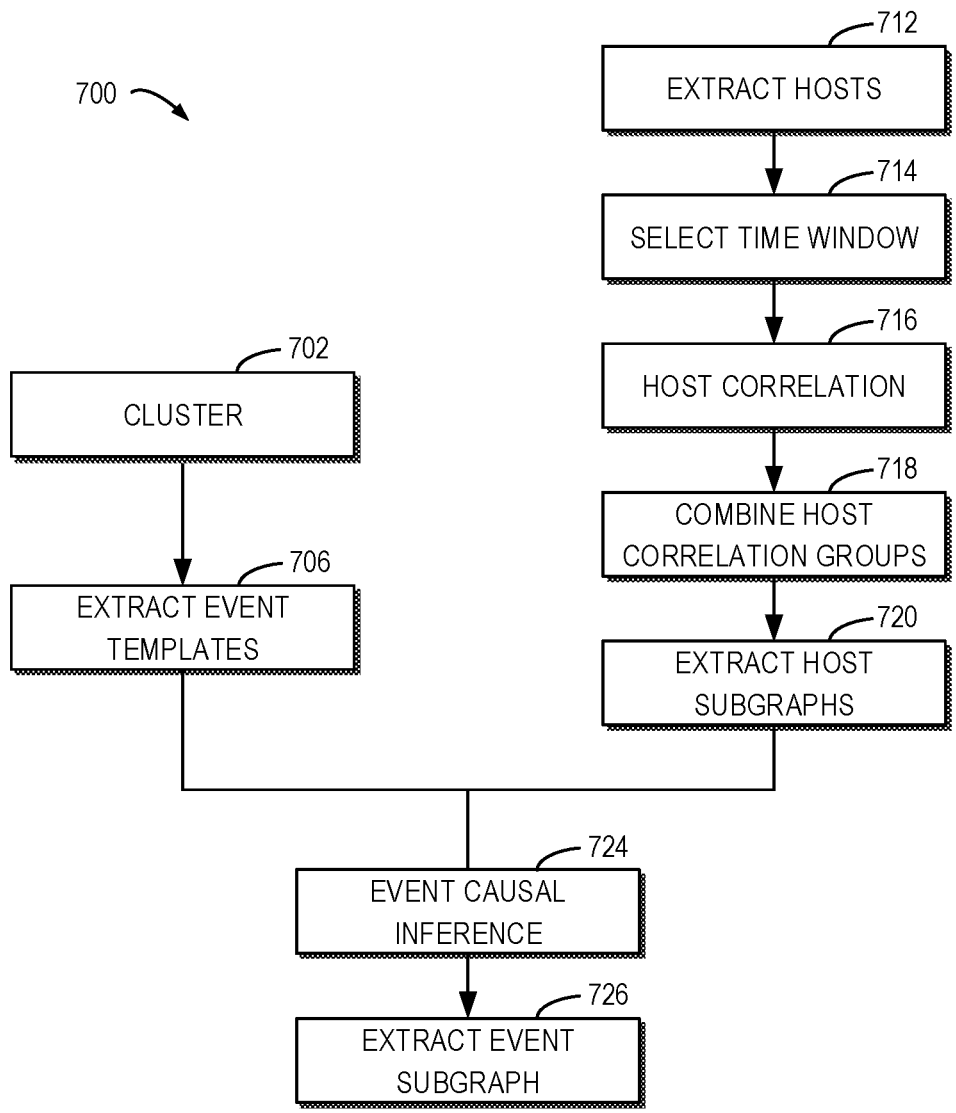
FIG. 7 is a flowchart of a method for event correlation in accordance with an embodiment of the present disclosure.

FIG. 7 is a flowchart illustrating a method 700 of event correlation in accordance with an embodiment of the present disclosure. The method 400 can be implemented at the computer system/server 12 of FIG. 1, the event grouping 96 of FIG. 3, or the training module 502 of FIG. 5.

At block 702, the training module 502 can cluster the events to separate the events into several groups. For example, an event that the CPU usage is above 90% may be categorized into the same group as another event that the CPU usage is above 95%. As a result, similar events can be classified into the same group so that the events can be standardized or templatized. In addition, outlier detection can be carried out to remove outlier. It is to be known that any clustering and outlier analysis technique currently known or to be developed in the future can be used.

At block 706, the training module 502 can extract an event template from each group of events. As described above, the event template can be also referred to as a template.

At block 712, the training module 502 can extract hosts associated with the events. For example, the training module 502 can determine the hosts where the events occur.

At block 714, the training module 502 can select a time window based on the correlation of the events. For example, two most-correlated events can be determined in a default time window. Then, the time window can be selected to be a time period that spans the two events.

At block 716, the training module 502 can determine correlation of the host in each time window or time slot. For example, the training module 502 can determine a host Bayesian network in each time window.

At block 718, the training module 502 can combine the correlated host groups. For example, the training module 502 can combine the host Bayesian networks from multiple time windows. For example, a conditional frequency table can be determined for each Bayesian network. The conditional frequency tables can be combined to obtain a combined conditional frequency table, for example, a weighted conditional frequency table. A combined Bayesian network can be constructed based on the combined conditional frequency table.

At block 720, the training module 502 can extract host subgraphs from the combined Bayesian network. For example, each node in a host subgraph is not connected to another node (for example, all the other nodes) in the Bayesian network outside the host subgraph.

Figure 8:
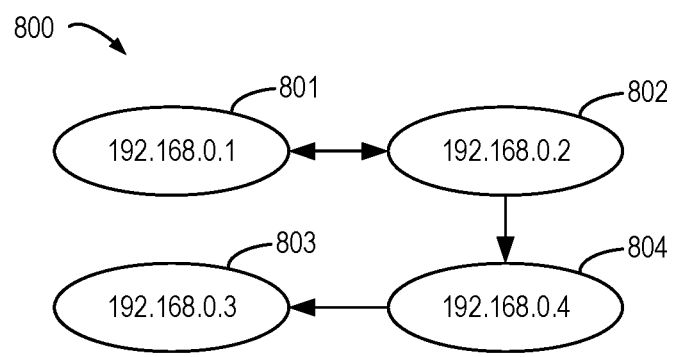
FIG. 8 is a schematic diagram of a host subgraph in accordance with an embodiment of the present disclosure.
Figure 9:
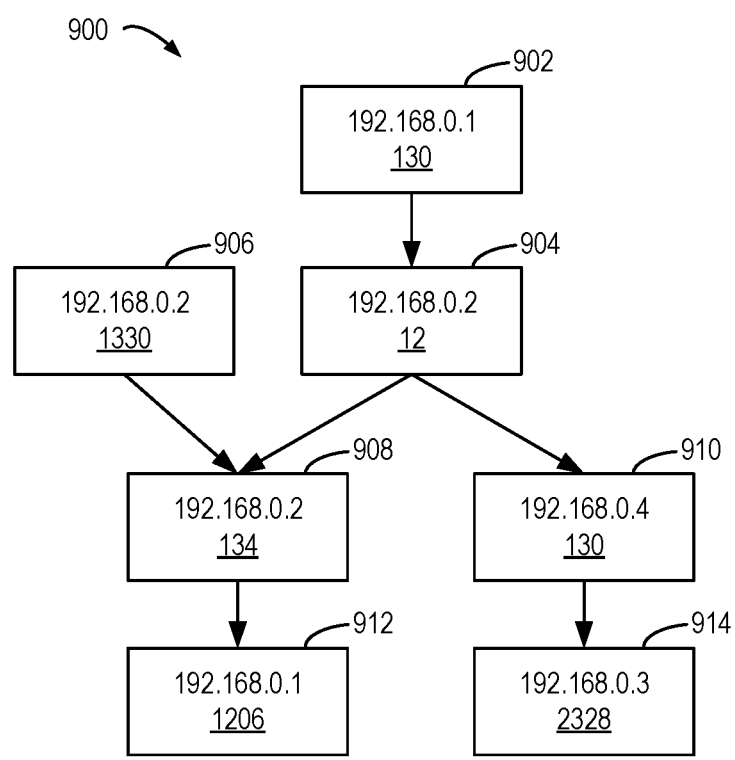
FIG. 9 is a schematic diagram of an event subgraph in accordance with an embodiment of the present disclosure.

At block 724, the training module 502 can perform event causal inference on the events based on the host subgraph so as to obtain the event subgraph. FIG. 8 is a schematic diagram of a host subgraph 800 in accordance with an embodiment of the present disclosure, and FIG. 9 is a schematic diagram of an event subgraph 900 in accordance with an embodiment of the present disclosure. The host subgraph 800 includes four hosts 801-804, and the event subgraph 900 includes events 902-914 that occur on the hosts 801-804. For example, the event 902 occurs on the host 801. FIG. 9 also shows a template identifier for each event. For example, the event 902 has the template identifier 130, the event 904 has the template identifier 12, and so on.

In an embodiment, the training module 502 can select all the event templates that are associated with each host subgraph. For example, the training module 502 can select all the event templates associated with the host subgraph 800. The training module 502 can perform causal inference of the selected event templates through a PC-algorithm, for example. As a result, the training module 502 can obtain the event subgraph 900 as shown in FIG. 9.

At block 726, the training module 502 can extract an event subgraph from the event Bayesian network. If an event subgraph of the event Bayesian network has only one root node, the training module 502 will extract the event subgraph accordingly. If an event subgraph of the event Bayesian network has more than one root node, the training module 502 could merge the root node V with another node U if the nodes V and U satisfy one or more predefined conditions. The first condition is that the node U is on the same level and is the common cause of their child node. The second condition is that the nodes V and U have similar templates. The third condition is that the nodes V and U are the same event on different hosts. If none of the conditions is satisfied, the training module 502 can treat the root node V separately by extracting the maximum subgraph such that V is the only root node. After the nodes are merged, the training module 502 can update the combined templates and/or the conditional probability table.

The training module 502 can obtain a number of event subgraphs and when an alarm storm happens in the future, the alarm storm can match one of the event subgraphs to quickly identify the root cause of the alarm storm.

Figure 10:
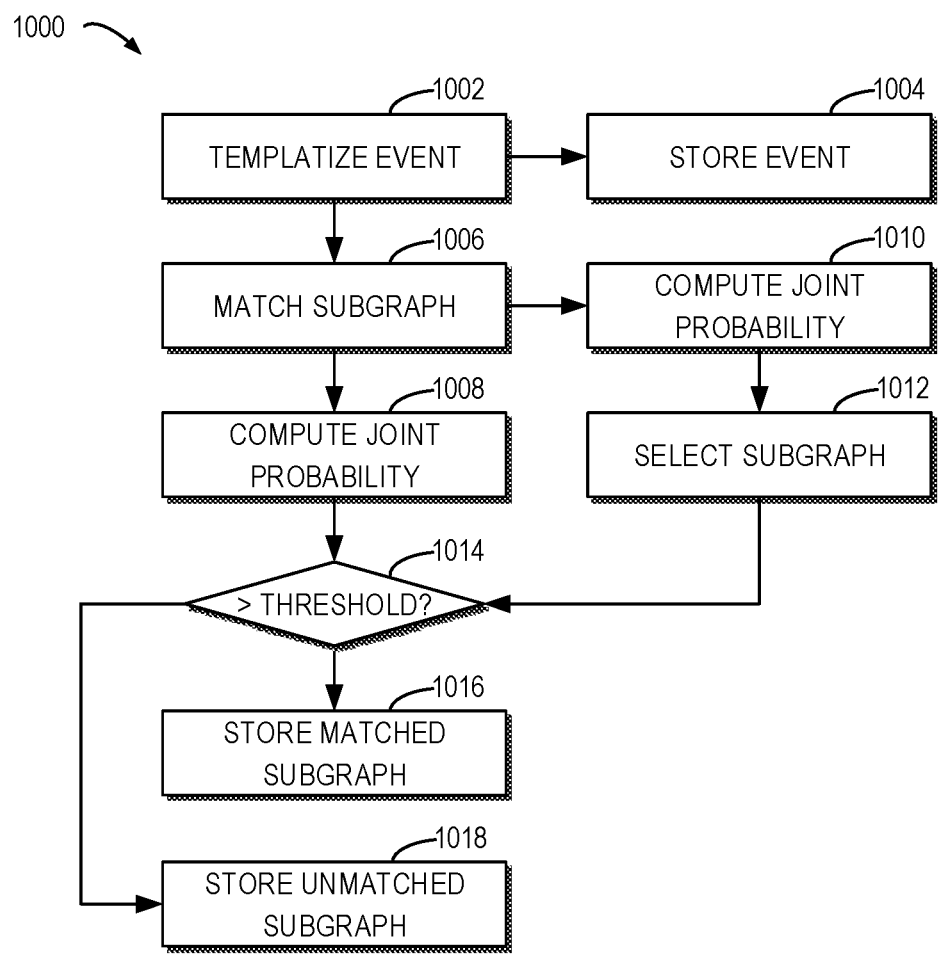
FIG. 10 is a flowchart of a method for online grouping in accordance with an embodiment of the present disclosure.

FIG. 10 is a flowchart of a method 1000 for an online grouping method in accordance with an embodiment of the present disclosure. The method 1000 can be implemented at the computer system/server 12 of FIG. 1, the event grouping 96 of FIG. 3, and the online grouping module 504 of FIG. 5.

At block 1002, the online grouping module 504 can templatize the events. If the events cannot be templatized, for example, the events cannot match any of the known templates, the online grouping module 504 will store at block 1004 the events that cannot be templatized.

At block 1006, the online grouping module 504 can match the events to the event subgraphs. For example, the online grouping module 504 can match the events to the event subgraphs based on the similarities between the events and the event subgraphs. For example, if the hosts of the events are close enough to hosts of an event subgraph, it is determined that the events match the event subgraph. If the events match only one of the subgraphs, the method 1000 proceed to block 1008, where the online grouping module 504 can compute a joint probability of the matched event subgraph. At block 1014, the online grouping module 504 can determine whether the joint probability of the event subgraph exceeds a predefined threshold. If it is determined that the joint probability exceeds the predefined threshold, the online grouping module 504 can store the matched subgraph at block 1016. If it is determined that the joint probability does not exceed the predefined threshold, the online grouping module 504 can store the unmatched subgraph at block 1018.

If it is determined at block 1006 that more than one subgraph matches the events, the online grouping module 504 can compute at block 1010 the joint probability for each of the matched subgraphs and the online grouping module 504 can select at block 1012 one of the subgraphs with the greatest joint probability before proceeding to block 1014.

Figure 11:
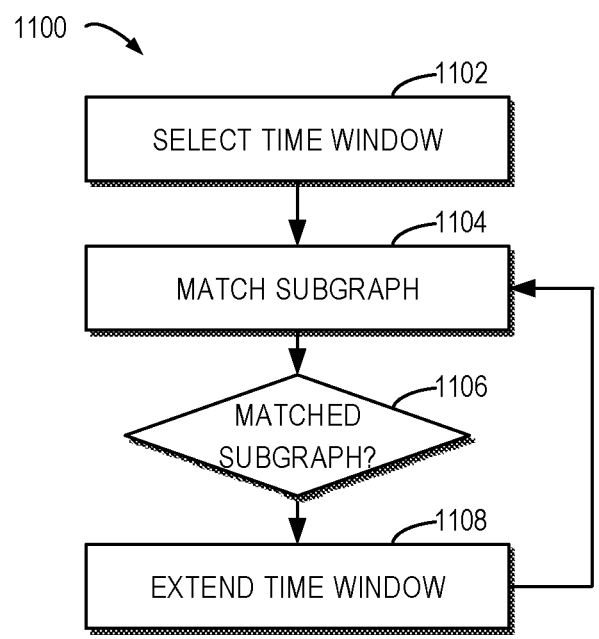
FIG. 11 is a flowchart of another method for online grouping in accordance with an embodiment of the present disclosure.

FIG. 11 is a flowchart of another method 1100 for an online grouping method in accordance with an embodiment of the present disclosure. The method 1100 can be implemented at the computer system/server 12 of FIG. 1, the event grouping 96 of FIG. 3, and the online grouping module 504 of FIG. 5.

At block 1102, the online grouping module 504 can select a time window for gathering the events. For example, when the period of the time window is over, the online grouping module 504 can start to process the events.

At block 1104, the online grouping module 504 can match the events to the event subgraphs. For example, the block 1104 can be implemented by the method 1000 of FIG. 10.

At block 1106, the online grouping module 504 can determine whether there is a matched subgraph that can be identified. If no subgraph can match the events in the time window, the online grouping module 504 can extend at block 1108 the time window before proceeding to block 1104.

Figure 12:
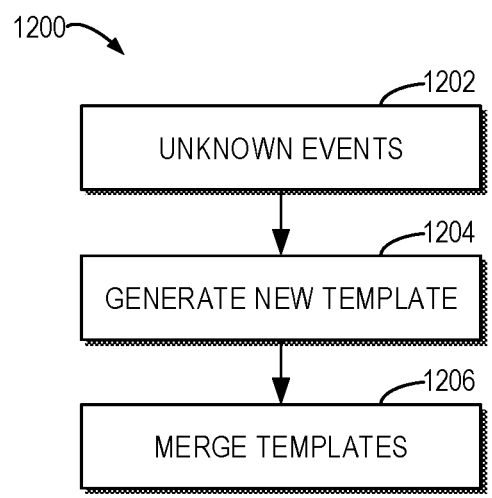
FIG. 12 is a flowchart of a method for updating templates in accordance with an embodiment of the present disclosure.

FIG. 12 is a flowchart of a method 1200 of updating templates in accordance with an embodiment of the present disclosure. The method 1200 can be implemented at the computer system/server 12 of FIG. 1, the event grouping 96 of FIG. 3, and the updating module 506 of FIG. 5.

At block 1202, the updating module 506 can obtain the unknown events from the online grouping module 204, for example. The unknown events can be the events that cannot match any of the templates.

At block 1204, the updating module 506 can generate one or more new templates based on the unknown templates by clustering technique or the like. It is to be understood that any other suitable method currently known or to be developed in the future can be used.

At block 1206, the updating module 506 can merge the new templates with the existing templates to update the template set. The updated template set can be used in the online grouping module 504 for subsequent processing.

Figure 13:
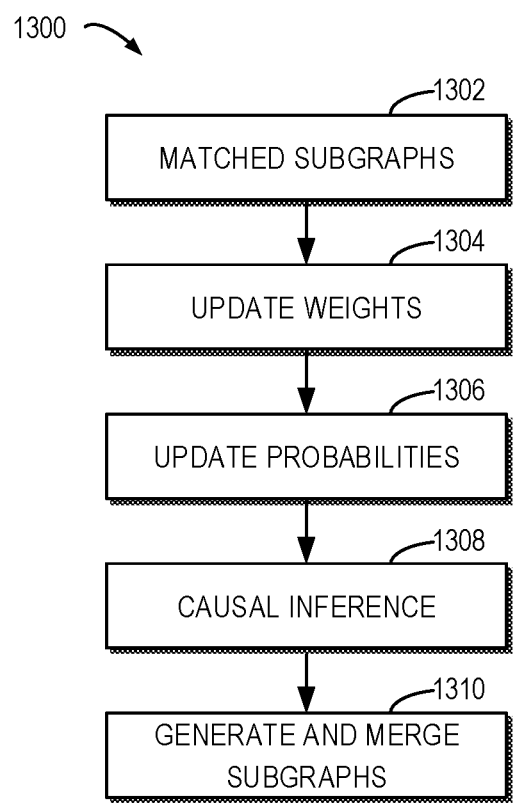
FIG. 13 is a flowchart of a method for updating the event graph in accordance with an embodiment of the present disclosure.

FIG. 13 is a flowchart of a method 1300 of updating subgraphs in accordance with an embodiment of the present disclosure. The method 1300 can be implemented at the computer system/server 12 of FIG. 1, the event grouping 96 of FIG. 3, and the updating module 506 of FIG. 5.

At block 1302, the updating module 506 can obtain matched subgraphs from the online grouping module 504, for example. At block 1304, the updating module 508 can update the weights of the edges in the host Bayesian network based on the matched subgraphs. At block 1306, the updating module 508 can update the probabilities of the nodes in the host Bayesian network.

At block 1308, the updating module 508 can perform causal inference based on the new events. In this way, the updating module 508 can obtain the updated event subgraphs based on the updated host subgraphs. This can be performed in a similar way to block 724 of FIG. 7.

At block 1310, the updating module 508 can generate event subgraphs by extracting event subgraphs from the updated event subgraphs. The extraction can be implemented in a similar way to block 726 of FIG. 7. The generated event subgraphs can be merged into the event Bayesian network. The event Bayesian network can be provided to the online grouping module 504 to facilitate subsequent event grouping.

It should be noted that the process of event grouping and the system 200 according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A computer-implemented method comprising:
   identifying, by one or more processors, a plurality of alarm events received during a predefined time window;
   in response to determining that there is an insufficient number of alarm events in the plurality of alarm events according to a threshold, extending the predefined time window to receive additional alarm events until there are a sufficient number of alarm events in the plurality of alarm events;
   comparing, by one or more processors, the plurality of alarm events with a plurality of groups of historical alarm events and determining a group of historical alarm events from the plurality of groups of historical alarm events that is most similar to the plurality of alarm events, wherein the group of historical alarm events occurred at an entity prior to the plurality of alarm events;
   determining, by one or more processors, a joint probability of the group of historical alarm events, wherein the joint probability indicates a likelihood that each historical alarm event in the group of historical alarm events occurs simultaneously;
   in response to the joint probability of the group of historical alarm events exceeding a predefined threshold, determining, by one or more processors, a first correlation among the group of historical alarm events that occurred at the entity prior to the plurality of alarm events; and
   determining, by one or more processors, a root cause of the plurality of alarm events based on the first correlation.

2. The method of claim 1, wherein the first correlation is characterized by a first Bayesian network comprising nodes representing the group of historical alarm events and edges representing conditional dependencies among the group of historical alarm events, the first Bayesian network comprising a root node indicating a root cause of the group of historical alarm events;
- wherein the first Bayesian network is determined from a subgraph of a second Bayesian network comprising nodes representing entities and edges representing conditional dependencies among the entities; and
- wherein the subgraph comprises nodes representing a group of entities associated with the group of historical alarm events and edges representing conditional dependencies among the group of entities, each node in the subgraph not being connected to any node in the second Bayesian network outside the subgraph.

3. The method of claim 2, wherein the second Bayesian network is determined by:
- determining, by one or more processors, a third Bayesian network for a first time slot, the third Bayesian network comprising nodes representing a first set of entities and edges representing conditional dependencies among the first set of entities;
- determining, by one or more processors, a fourth Bayesian network for a second time slot, the fourth Bayesian network comprising nodes representing a second set of entities and edges representing conditional dependencies among the second set of entities; and
- combining, by one or more processors, the third and fourth Bayesian networks to obtain the second Bayesian network.

4. The method of claim 3, wherein the first time slot is determined based on a first alarm event and a second alarm event that are most correlated in a first time window, and the second time slot is determined based on a third alarm event and a fourth alarm event that are most correlated in a second time window.

5. The method of claim 1, wherein the group of historical alarm events are obtained in a dynamically adjustable time slot.

6. The method of claim 2, wherein the group of entities comprise hosts or applications where the alarm events occur.

7. The method of claim 2, further comprising:
- updating, by one or more processors, the subgraph of the second Bayesian network based on the plurality of alarm events; and
- updating, by one or more processors, the first Bayesian network by performing causal inference based on the updated subgraph of the second Bayesian network and the plurality of alarm events.

8. The method of claim 1, further comprising extracting templates of the alarm events, and wherein the first correlation comprises conditional dependencies among the templates of the group of historical alarm events.

9. The method of claim 8, further comprising:
- in response to one of the alarm events failing to match any of the extracted templates, extracting an additional template from the one of the alarm events failing to match any of the extracted templates; and
- updating the extracted templates by incorporating the additional template.

10. The method of claim 1, wherein determining the plurality of alarm events comprises in response to one of the alarm events occurring in a predefined time window, grouping the one of the alarm events into the plurality of alarm events.

11. A device comprising:
a processor; and
a memory having instructions stored thereon for execution by the processor, the instructions, when executed by the processor, cause the device to perform an operation, comprising:
- identifying a plurality of alarm events received during a predefined time window;
- in response to determining that there is an insufficient number of alarm events in the plurality of alarm events according to a threshold, extending the predefined time window to receive additional alarm events until there are a sufficient number of alarm events in the plurality of alarm events;
- comparing, by one or more processors, the plurality of alarm events with a plurality of groups of historical alarm events and determining a group of historical alarm events from the plurality of groups of historical alarm events that is most similar to the plurality of alarm events, wherein the group of historical alarm events occurred at an entity prior to the plurality of alarm events;
- determining, by one or more processors, a joint probability of the group of historical alarm events, wherein the joint probability indicates a likelihood that each historical alarm event in the group of historical alarm events occurs simultaneously;
- in response to the joint probability of the group of historical alarm events exceeding a predefined threshold, determining a first correlation among the group of historical alarm events that occurred at the entity prior to the plurality of alarm events; and
- determining a root cause of the plurality of alarm events based on the first correlation.

12. The device of claim 11, wherein the first correlation is characterized by a first Bayesian network comprising nodes representing the group of historical alarm events and edges representing conditional dependencies among the group of historical alarm events, the first Bayesian network comprising a root node indicating a root cause of the group of historical alarm events;
- wherein the first Bayesian network is determined from a subgraph of a second Bayesian network comprising nodes representing entities and edges representing conditional dependencies among the entities; and
- wherein the subgraph comprises nodes representing a group of entities associated with the group of historical alarm events and edges representing conditional dependencies among the group of entities, each node in the subgraph not being connected to any node in the second Bayesian network outside the subgraph and the group of entities comprising the entity associated with a correlated entity.

13. The device of claim 12, wherein the second Bayesian network is determined by:
- determining, by one or more processors, a third Bayesian network for a first time slot, the third Bayesian network comprising nodes representing a first set of entities and edges representing conditional dependencies among the first set of entities;
- determining, by one or more processors, a fourth Bayesian network for a second time slot, the fourth Bayesian network comprising nodes representing a second set of entities and edges representing conditional dependencies among the second set of entities; and combining, by one or more processors, the third and fourth Bayesian networks to obtain the second Bayesian network.

14. The device of claim 13, wherein the first time slot is determined based on a first alarm event and a second alarm event that are most correlated in a first time window, and the second time slot is determined based on a third alarm event and a fourth alarm event that are most correlated in a second time window.

15. The device of claim 11, wherein the group of historical alarm events are obtained in a dynamically adjustable time slot.

16. The device of claim 12, wherein the group of entities comprise hosts or applications where the alarm events occur.

17. The device of claim 12, further comprising:
updating, by one or more processors, the subgraph of the second Bayesian network based on the plurality of alarm events; and
updating, by one or more processors, the first Bayesian network by performing causal inference based on the updated subgraph of the second Bayesian network and the plurality of alarm events.

18. A computer program product being tangibly stored on a non-transitory machine-readable medium and comprising machine-executable instructions, the instructions, when executed on a device, causing the device to perform an operation, comprising:
identifying a plurality of alarm events received during a predefined time window;
in response to determining that there is an insufficient number of alarm events in the plurality of alarm events according to a threshold, extending the predefined time window to receive additional alarm events until there are a sufficient number of alarm events in the plurality of alarm events;
comparing, by one or more processors, the plurality of alarm events with a plurality of groups of historical alarm events and determining a group of historical alarm events from the plurality of groups of historical alarm events that is most similar to the plurality of alarm events, wherein the group of historical alarm events occurred at an entity prior to the plurality of alarm events;
determining, by one or more processors, a joint probability of the group of historical alarm events, wherein the joint probability indicates a likelihood that each historical alarm event in the group of historical alarm events occurs simultaneously;
in response to the joint probability of the group of historical alarm events exceeding a predefined threshold, determining a first correlation among the group of historical alarm events that occurred at the entity prior to the plurality of alarm events; and
determining a root cause of the plurality of alarm events based on the first correlation.

* * * * *